United States Patent Office 3,223,713
Patented Dec. 14, 1965

3,223,713
CYCLIC MALONALDEHYDE DIACETALS
George Kesslin, Teaneck, N.J., and Robert W. Handy, Stony Point, and James Steinmetz, Congers, N.Y., assignors to Kay-Fries Chemicals, Inc., West Haverstraw, N.Y., a corporation of New York
No Drawing. Filed July 2, 1963, Ser. No. 292,466
4 Claims. (Cl. 260—338)

This invention relates to novel cyclic diacetals of malonaldehyde and to the method of their preparation. More particularly, the invention concerns such diacetals derived from aliphatic polyols containing from 4 to 6 carbon atoms.

The cyclic malonaldehyde diacetals of the invention have the general formula:

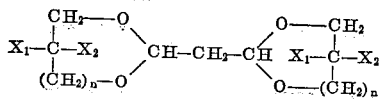

wherein $X_1$ is selected from the group consisting of H and $CH_3$ and $X_2$ is selected from the group consisting of H, $HO(CH_2)_4$, $NO_2$ and $NH_2$, and $n$ may vary from 0 to 2. Thus, when $n$ is 0, $X_1$ is H and $X_2$ is $HO(CH_2)_4$, when $n$ is 1, $X_1$ is $CH_3$ and $X_2$ may be $NO_2$ or $NH_2$ and when $n$ is 2, $X_1$ and $X_2$ are both H.

The cyclic diacetals of the invention may thus be considered as dioxolane, dioxane, or dioxepane derivatives, depending upon whether there are two, three or four carbon atoms between the two oxygen atoms. They are prepared preferably by transacetalization of a lower molecular weight malonaldehyde diacetal with a selected aliphatic polyol in the presence of a Lewis type acid as a catalyst, such as, for example, boron trifluoride etherate, in accordance with conventional procedures.

The novel compounds of the invention differ from previously known compounds of this type in two respects. First, they are diacetals of malonaldehyde, rather than acetals of glyoxal or of glutaraldehyde. Second, they differ in the structure of the aliphatic carbon chain which links the two cyclic oxygen atoms.

There are employed as starting materials in accordance with the invention, straight or branched chain saturated aliphatic polyols, which may be substituted by nitro, amino, or hydroxy groups, and which contain from 4 to 6 carbon atoms. Examples of such starting compounds include:

Butane diol-1,4
Hexane triol-1,2,6
2-nitro-2-methyl propane diol-1,3
2-amino-2-methyl propane diol-1,3 but the invention is not limited to the use of these specific starting materials.

The aforementioned starting materials are reacted with a lower molecular weight malonaldehyde diacetal, such as, for example, malonaldehyde tetramethyl diacetal, malonaldehyde tetraethyl diacetal, or malonaldehyde trimethyl monoethyl diacetal, the aliphatic polyol being in slight (2% to 5%) molar excess, in the presence of boron trifluoride etherate as catalyst, preferably in presence of an organic solvent. The lower molecular weight alcohol formed by the transacetalization reaction is distilled off, preferably under vacuum, the catalyst neutralized with sodium ethylate, and the crude reaction mixture distilled under high vacuum. The resulting products are mainly crystalline solids at room temperature.

The novel malonaldehyde diacetals of the invention are useful as cross-linking agents for synthetic resins, proteins, and cellulosic materials. The diacetals which contain hydroxy groups can serve as modifiers for epoxy and urethane resins, and as dye carriers for ballpoint pen inks. The diacetals react with water and can be employed for scavenging traces of moisture such as occur, for example, in transformer oils, without leaving deleterious residues or adversely affecting the quality of the oils.

The following examples serve to illustrate the preparation and properties of the novel diacetals of the invention, but are not to be considered as limiting:

EXAMPLE 1

Diacetal derived from butane diol-1,4

1 molecular equivalent of malonaldehyde trimethyl monoethyl diacetal

178 grams, were dissolved in about 750 cc. of toluene, and there were added to the solution from 2% to 5% in excess of 2 mols of butane diol-1,4, and from about 0.5 to 2 cc. of boron trifluoride etherate per mole of trimethylmonoethyl diacetal. Distillation over a still head was started immediately under a vacuum of 15 to 28 inches to maintain the liquid temperature below about 112°–113° C. When all the low boiling alcohols formed had been removed by distillation as azeotropes with toluene, the catalyst was neutralized with a volume of sodium ethylate (12.5% Na) equal to four times the volume of boron trifluoride etherate used. The crude reaction mixture was then distilled under high vacuum (0.5 to 2.0 mm.), forecuts being taken as necessary, to recover toluene and then the product.

The resulting diacetal had a melting point of 36° C., and a boiling point of 107–109° C. at 0.8 mm., and had the analysis C 62.88%; $H_2$ 9.62%; $O_2$ 17.50% and the probable structural formula:

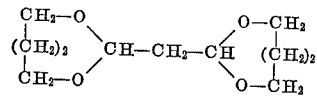

EXAMPLE 2

Diacetal derived from 2-nitro-2-methyl-propane diol-1,3

1 molar equivalent of malonaldehyde trimethyl monoethyl diacetal was reacted with a 2–5% molar excess over 2 mols of 2-nitro-2-methyl-propane diol-1,3, following the procedure of Example 1. The diacetal was obtained in the form of a slurry, after distilling off the toluene at normal pressure at 112–113° C. The slurry was filtered hot at 100°–110° C. and upon air drying, yielded a product having a melting point of 215°–220° C., the analysis, C 43.42%; $H_2$ 6.00%; $N_2$ 9.15%; $O_2$ 41.43%, and had the probable structural formula:

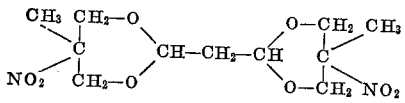

EXAMPLE 3

*Diacetal derived from 2-amino-2-methyl-propane diol-1,3*

220.5 grams of the diol were added to 685 grams of isopropanol (representing a 5% molar excess over 2 mols per mol of malonaldehyde acetal reactant). Dry HCl was passed into the solution forming a slurry of the HCl salt of 2-amino-2-methyl-propane diol-1,3. Then there was added 178 grams of malonaldehyde trimethyl monoethyl diacetal at room temperature and the reaction mixture was heated under reflux at 80°–82° C. At 60°–65° C. all solid passed into solution and after about ½ hour under reflux the product started to precipitate. Refluxing was continued for a total of 2 hours, when the reaction mixture was cooled and the product filtered off and washed with 2–50 cc. portions of isopropanol and air dried at room temperature. There were obtained 162 grams of a light yellow product corresponding to a yield of 50.8%. Refluxing the filtrate for an additional 10 hours increased the yield by 11.8 grams or 3.7%, making the total yield 54.5%. The product had a melting point of 223° C. and analyzed C 39.90%; $H_2$ 8.04%; $N_2$ 7.95%; $O_2$ 44.11%; and its probable structural formula was:

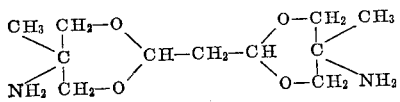

EXAMPLE 4

*Diacetal derived from hexanetriol-1,2,6*

The diacetal obtained by reacting malonaldehyde trimethyl monoethyl diacetal and hexanetriol-1,2,6 was prepared by a procedure similar to that of Example 1. The resulting product had a melting point of 93.5° C. and a boiling point of 202°–212° C. at 0.2 mm. pressure. The compound analyzed C 59.26%; $H_2$ 9.50%; $O_2$ 31.24%. Its probable structural formula is:

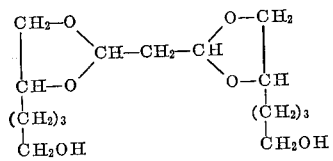

By employing similar methods of transacetalization, there may also be prepared novel malonaldehyde diacetals using as starting materials the following: ethylene glycol, glycerol, propane diol-1,2, butane diol 1,3, and methyl Cellosolve (ethylene glycol monomethyl ether).

What is claimed is:
1. The cyclic diacetal of malonaldehyde and butane-diol-1,4.
2. The cyclic diacetal of malonaldehyde and 2-nitro-2-methyl-propane-diol-1,3.
3. The cyclic diacetal of malonaldehyde and 2-amino-2-methyl-propane-diol-1,3.
4. The cyclic diacetal of malonaldehyde and hexane-triol-1,2,6.

References Cited by the Examiner

Rondestvedt, J. Org. Chem., vol. 26, pp. 2247–53 (1961).

WALTER A. MODANCE, *Primary Examiner.*

NICHOLAS S. RIZZO, *Examiner.*